3,410,667
SEPARATION PROCESS OF URANIUM FROM IRON, THORIUM AND RARE EARTHS BY ION EXCHANGE RESIN

Mohamed K. Saad El-Din Sherief, Assiut University, Cairo, Egypt, and Andor Almásy, Veszprem, Hungary
No Drawing. Filed Oct. 29, 1965, Ser. No. 505,754
4 Claims. (Cl. 23—322)

ABSTRACT OF THE DISCLOSURE

A process for recovering uranium in pure form from a contaminated uranium containing a high ferric ion content relative to the uranyl ion content by treating the contaminated uranium with a hydrochloric acid solution and thereafter saturating the acidified solution with $SO_2$ to reduce the ferric ion content and finally effecting the separation of uranyl ions by means of an anion exchange resin.

---

The invention relates to the separation of uranium from a solution containing considerable quantity of iron, thorium and rare earth metals in one step.

It is known that uranyl ion forms complex compounds in concentrated chloride ion solution. In the Battelle Memorial Institute report (USAEC Report BMI–242/-1950/) attempts have been made to separate uranium from thorium values by means of 6 M HCl or 5 M NaCl solutions and for the separation anion exchange resins have been used. In concentrated chloride ion solution however, the $Fe^{III}$-ions form complex compounds which have nearly the same absorption and resorption behaviour as that of the uranyl complex compounds. Consequently, during the application of the process above-mentioned it is observed that $Fe^{III}$-ions are always accompanying uranyl ions, accordingly, this method is disadvantageous to apply for such ore digesting solutions which contain iron because the following disadvantages have to be taken into consideration.

(1) The adsorption capacity of the anion exchange resin column in respect to uranyl ions is reduced.

(2) $Fe^{III}$-ion always accompanies the uranyl ion whereby the end-product is contaminated.

As in general the amount of iron is usually higher than that of the uranium content in uranium ores an economical separation can be effected by reducing the iron content of the raw material beforehand in a separated process.

A more economical way would be to effect this separation in one step e.g. by reducing the $Fe^{III}$-ions to $Fe^{II}$-ions, because the behaviour of the latter considerably differs from that of the uranyl ions. It was ascertained (J. W. Clegg and D. D. Foley: Uranium Ore Processing, Reading, Mass., Addison-Wesley Publ. Co. 1958, pages 201 and 220 to 221) that the reduction of $Fe^{III}$-ions to $Fe^{II}$-ions cannot be successfully performed in the presence of uranyl ions. In case of sulphate solutions the $Fe^{III}$-ion can be reduced in the presence of uranyl ions by using Zn or Al as reductants but in many cases it occurs that a part of the uranyl ion is reduced also to lower valencies. It was also established that for the reduction of $Fe^{III}$-ions in sulphate solutions to separate iron from the uranyl ions the use of hydrogen sulfide, sulphur dioxide or sulphite reductants is undesirable because of the possibility of producing polythionates. These polythionates are namely completely adsorbed by the resin bed applied during the anion exchange process. Consequently, the exchange sites are occupied by them and in this manner the capacity of the resin for uranyl absorption is reduced.

It is also known that between the $Fe^{II}$-ion and the uranyl ion there is a redox equilibrium as follows:

$$2Fe^{II} + U^{VI} \rightleftharpoons 2Fe^{III} + U^{IV}$$

Although this equilibrium is pushed to the left side but depending on circumstances a formation of a considerable amount of $U^{IV}$ ions can be observed e.g. in the presence of fluoride ions, the equilibrium previously mentioned is pushed to the right side and $UF_4$ is formed.

It has now surprisingly been found that the separating process can be effected in one step working in 8 M HCl solutions and using sulphur dioxide as reductant for the reduction of $Fe^{III}$-ions and in this manner the difficulties previously described can be eliminated. Further on it was found that in case of 8 M HCl solutions and after saturating this solution with sulphur dioxide, the reduction of the $Fe^{III}$-ions to $Fe^{II}$-ions does not go to completion but reaches an economical value and is suitable for the separation of uranyl ion from iron.

The object of the present invention is therefore a process according to which for the separation of uranium from iron a HCl solution can be used in such a concentration wherein the uranyl ions form a complex compound, this solution is saturated with sulphur dioxide and the separation is effected by means of an anion exchange resin. The concentration of the HCl solution applied is adjusted to a value of about 8 M. As anion exchange resin a strongly basic anion exchange resin is preferably used.

In this case the oxidation reduction system of $Fe^{III}/Fe^{II}$-ions reaches a constant value in which the $Fe^{III}$-ions are present in a minimum quantity and the $U^{VI}$-ions are not reduced by the $Fe^{II}$-ions present. This method working with $SO_2$ as reductant in a saturated 8 M HCl solution has two main advantages over all known methods.

(1) The adsorption capacity of the anion exchange resin with respect to the uranyl ions is high as $Fe^{III}$-ion concentration became very low (a minimum amount), and so the $Fe^{III}$-ions will not compete with the uranyl ions for the adsorbing by the resin.

(2) The end-product of uranium is obtained in a very pure state.

The invention will be further understood by the following example:

A sulphuric acidic solution of 721 g. Egyptian Monazite was precipitated by addition of NaOH solution in hydroxide form. This precipitate was dissolved in 32 l. 8 M HCl and then saturated with $SO_2$. The separation achieved by using 10 l. strong basic anion exchange resin "Varion AD" filled in a column. The column was first washed with a 8 M HCl solution, then treated at a rate of 0.8 l./min. with the solution of Monazite prepared in the first step. The effluent contained no traces of uranium. After finishing the influent, the column was washed with 11.5 l. 8 M HCl to wash the interstitial fluid and the traces of physically adsorbed thorium and rare earth. Then followed the eluting by distilled water 20 l. The following table illustrates the obtained results from the described experiment.

URANIUM CONTENT OF THE ELUATE

| Sample 1 | U, mg./ml. | U, mg. | ThO₂, g. | RE Oxide, g. |
|---|---|---|---|---|
| 41.6 | | | 36.5 | 410.1 |
| 4.0 | | | | |
| 1.9 | 0.19 | 351 | | |
| 0.9 | 1.37 | 1,260 | | |
| 0.9 | 0.40 | 364 | | |
| 2.0 | 0.10 | 200 | | |
| 2.0 | 0.013 | 26 | | |
| | | 2,201 | | |

The reported results in the previous table, which are obtained from the used amount of monazite (the uranium amount in Egyptian monazite is equal to 0.309%), assure that this separation process can produce nearly 98% yield of pure uranium. It can be noticed also that the great amount of uranium lies in the region of the maximum of the elution curve, so a complete and sharp separation is obtained by this method.

For analytical purposes, a part of the uranyl solution has been precipitated by means of $NH_4OH$ as ammonium diuranate and then heated at 500° C. to change it to $UO_3$. The X-ray fluorescence analysis showed that the obtained uranium is very pure and contains only traces of iron in comparison with a sample obtained without reducing with $SO_2$, which contains a large amount of iron.

The obtained uranium solution is in a very pure form, so it can be used directly as starting material to prepare uranium in the highest purity form by known methods.

What we claim is:

1. A process for separating uranium from a contaminated uranium having a high ferric ion content, relative to the uranyl ion content, comprising treating the aforesaid contaminated uranium with an aqueous hydrochloric acid solution containing hydrochloric acid in a concentration of about 8 M to form a uranyl ion complex in said solution thereafter saturating said solution with sulphur dioxide to reduce the ferric ions in said solution, and contacting the saturated solution with an anion exchange resin to remove the uranyl ions from said solution.

2. The process of claim 1 wherein said contaminated uranium contains thorium and rare earth metals.

3. The process of claim 1 wherein the concentration of hydrochloric acid in said aqueous solution is 8 M.

4. The process of claim 1 wherein said anion exchange resin is a strongly basic anion exchange resin.

References Cited

UNITED STATES PATENTS

| 2,756,123 | 7/1956 | Bailes et al. | 23—338 |
| 2,806,764 | 9/1957 | Balles et al. | 23—338 |

CARL D. QUARFORTH, *Primary Examiner.*

R. L. GRUDZIECKI, *Assistant Examiner.*